United States Patent [19]
Zylstra et al.

[11] Patent Number: 4,992,723
[45] Date of Patent: Feb. 12, 1991

[54] FAULT-POWERED POWER SUPPLY

[75] Inventors: Henry J. Zylstra, Alburnett; Steven J. Flock, Cedar Rapids, both of Iowa

[73] Assignee: Square D Company, Palatine, Ill.

[21] Appl. No.: 331,473

[22] Filed: Mar. 31, 1989

[51] Int. Cl.$^5$ ............................................. G05F 1/56
[52] U.S. Cl. ..................................... 323/284; 363/89; 361/42
[58] Field of Search ............... 323/282, 284, 285, 288, 323/235, 319; 361/42, 44; 363/89, 84

[56] References Cited

U.S. PATENT DOCUMENTS 4,683,415 7/1987 Zimmerman ..................... 323/235

Primary Examiner—Robert Skvot
Assistant Examiner—Emanuel Todd Voeltz
Attorney, Agent, or Firm—Larry I. Golden; Jose W. Jimenez

[57] ABSTRACT

An improved power supply is provided for circuit breaker applications and draws power from the power lines which the associated circuit breaker protects. The alternating current on the power lines is sensed by a current transformer and rectified by a full-wave rectifier. The full-wave rectified signal is alternately switched between a low impedance path, which does not provide power to the power supply, and a charging path, which does provide power to the power supply. During the major portion of the a.c. cycle, the full-wave rectified signal follows the low impedance path without loading the current transformer or distoring the current signal. However, near the zero crossings of the a.c. current signal, the low impedance path is opened so that the full-wave rectified signal charges a charging circuit. The charging circuit feeds a voltage regulator to provide output power from the power supply. While the rectified signal flows through the low impedance path, the charging circuit discharges and provides the power required by the peripheral circuitry of the circuit breaker. When the charge in the charging circuit drops below a predetermined set point, which is governed by the output of the regulator and feedback from the rectified signal, power is diverted from the low impedance path to recharge the charging circuit.

27 Claims, 4 Drawing Sheets

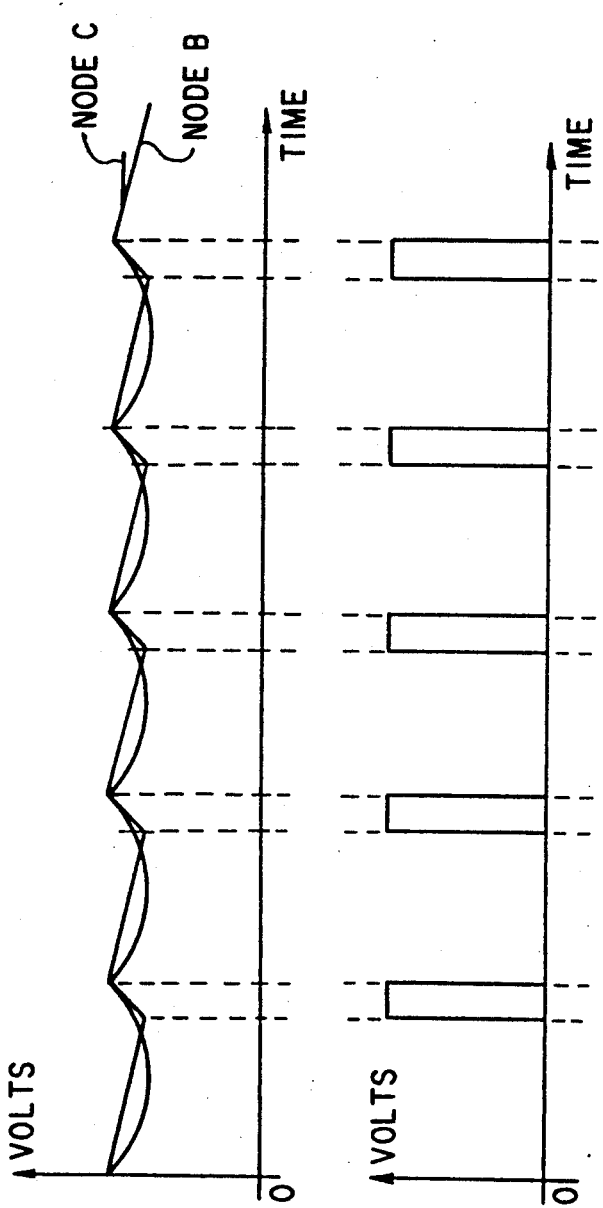
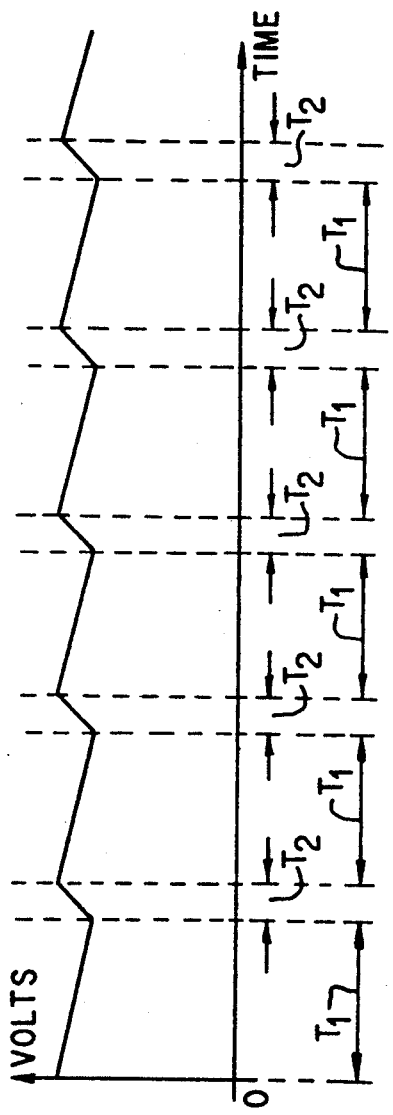
FIG. 2A
FIG. 2B
FIG. 2C

FAULT-POWERED POWER SUPPLY

REFERENCE TO CO-PENDING APPLICATIONS

This application was filed simultaneously with Ser. No. 331,926, entitled "Voltage-to-Frequency Squared Circuit" having the same inventive entities as the present application.

BACKGROUND OF THE INVENTION

1. Field of the Invention

This invention relates generally to power supplies, and more particularly to a switching power supply which is particularly useful in circuit breaker applications.

2. Description of the Related Art

In electric power distribution systems, circuit breakers are used to protect power lines and other distribution equipment from excessive current flows which tend to overheat and damage current conductors. Circuit breakers carry and monitor the current flowing through the power distribution lines. When the current reaches an undesirable high level in a particular line, a tripping device or trip unit associated with the circuit breaker interrupts current flow in the power line, usually by energizing an electromagnetic relay connected in series with the line. Each circuit breaker includes current monitoring circuitry, trip determination circuitry, and circuitry to power the tripping device. Moreover, many circuit breakers used in industrial applications offer sophisticated delay circuitry to maximize power dissipation and to prevent unnecessary tripping, alarm or annunciation circuitry, and other types of fault detection circuitry, such as circuitry for ground fault detection.

A power supply is needed to provide adequate power to the circuitry of the circuit breaker during operation. Since circuit breakers monitor the power in the distribution lines, power is conveniently drawn from the distribution lines to provide power for the power supply. Circuit breakers of this type are commonly referred to as "fault-powered" circuit breakers. Advantageously, fault-powered circuit breakers operate over a wide range of line current to ensure proper operation of the circuit breaker. For instance, under ground fault conditions, when current is drawn from the line through an external conductor, such as when the conductor comes into contact with a motor casing, the line current is low; the power supply must still be able to adequately power its associated circuitry and the tripping relay in order to isolate the affected power line and prevent the ground fault from causing damage, antithetically, a "short" circuit may produce currents in the power line which are many times greater than the rating of the line. To prevent damage caused by this type of severe overcurrent condition, the power supply contains surge protection so that it continues providing power to the associated circuitry and to the tripping relay in order to isolate the affected power line and prevent damage to the power line and any related electrical equipment. An overcurrent condition may produce currents in excess of twenty times the current encountered during a ground fault situation, and the power supply must be able to deliver an output suitable to power the circuitry of the circuit breaker over this entire operating range.

While fault-powered circuit breakers offer many advantages over externally powered circuit breakers, they also present some drawbacks. The most simple and straightforward power supply is a linear power supply which, if providing sufficient power at minimum input levels, must waste the power at higher input levels. This inherent inefficiency of linear power supplies is overcome by switching power supplies. However, switching power supplies can distort the power signal and upset the metering function as a result of the change in load presented to the current transformer as the power supply switches. Since the power signal being monitored by the current transformer is used by the trip-determination circuitry to control the tripping device, a distorted signal reduces the accuracy of the trip-determination circuitry. The reduced accuracy can cause the circuit breaker to trip unnecessarily, or to continue to pass current during an overload condition.

Moreover, some fault-powered circuit breakers cannot provide adequate power particularly during low current situations. At such times the available power is insufficient to energize electromagnetic tripping relays which draw a significant amount of power during actuation. To overcome this disadvantage, U.S. Pat. No. 4,258,403 issued Mar. 24, 1981 to Shimp discloses a ground fault circuit interrupter which charges a timing capacitor via a summing current transformer. When the charge on the timing capacitor reaches a predetermined level, the capacitor is completely discharged through the trip coil of the circuit interrupter. The electrical current is sufficient to actuate the trip coil to open circuit the power line. Therefore, during low current situations, the circuit breaker generates enough power to open circuit the power line to prevent possible damage. However, Shimp's circuit uses the timing capacitor to power only the trip coil, so that the circuit does not supplement the power supply during a ground fault situation. Instead, the separate timing capacitor is utilized as part of the tripping circuitry, so that the tripping circuitry not only initiates the tripping signal, but also provides the power needed to actuate the trip coil.

The present invention is directed to overcome one or more of the problems set forth above.

SUMMARY OF THE INVENTION

It is the primary object of the present invention to provide an efficient and accurate power supply.

It is an important object of the present invention to provide a power supply which minimizes distortion in the power signal.

It is another object of the present invention to provide a power supply in accordance with the above objects with a minimum number of component parts.

It is still another object of the present invention to provide a power supply which efficiently supplies power to an associated circuit breaker, particularly during low current conditions.

These and other objects of the present invention are realized by means of a power supply for a circuit breaker, which is powered by a current transformer sensing current in the conductor being monitored by the circuit breaker. The power supply is designed to switch near zero points in the power signal so as to minimize the load changes on the current transformer and thereby prevent distortion of the power signal. To further minimize loading effects and to conserve power, the sensed power signal is directed through a low impedance path for most of the operational cycle. It is only near the zero points in the power signal that the sensed power signal is used to deliver power to charging circuitry within the power supply for subsequent delivery to the circuit breaker.

In accordance with one aspect of the present invention, a power supply for a circuit breaker is provided where the circuit breaker carries current in a conductor. A current signal having a magnitude correlative to the current flowing in the conductor is produced. A charging circuit is charged by the current signal and delivers a voltage signal having a magnitude correlative to the charge stored in the charging circuit. A low impedance circuit is provided which bypasses the charging circuit. The current signal is directed through the charging circuit when the magnitude of the current signal falls below a predetermined magnitude, and the current signal is redirected through the low impedance circuit when the magnitude of the current signal rises above the predetermined magnitude.

In accordance with another aspect of the present invention, a method is provided for supplying power to a circuit breaker where the circuit breaker carries current in three conductors of a three-phase distribution circuit and can selectively interrupt current flowing in any of the conductors in response to a detected fault. According to this method, current signals are produced which are correlative to the current flowing in the respective conductors along with a current signal which is correlative to the sum of the currents flowing in each of the conductors. The current signals and the summed current signal are rectified, and the summed rectified signal is added to the largest of the rectified current signals. The added signal is then directed to a low impedance path when the signal is greater than a predetermined peak value, and redirected to a storage element when the signal is less than the predetermined percentage of its peak value. The added rectified signal charges the storage element and this charge, or stored energy, is used to power both the sensing circuitry and the trip unit associated with the circuit breaker.

BRIEF DESCRIPTION OF THE DRAWINGS

Other objects and advantages of the invention will become apparent upon reading the following detailed description and upon reference to the drawings in which:

FIG. 2 is an illustration of waveforms at various points in the diagram of FIG. 1;

Figure 1:
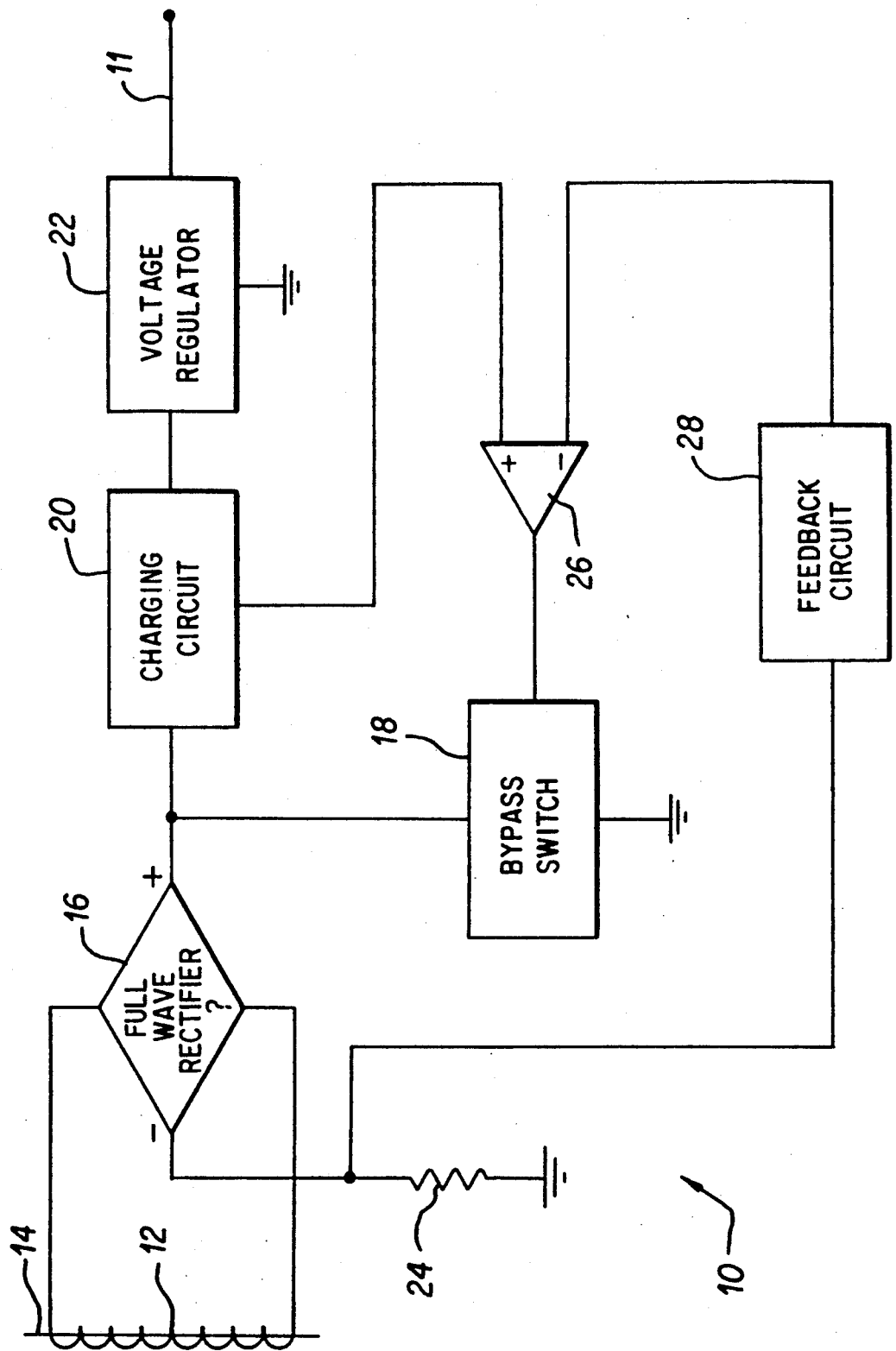
FIG. 1 is a block diagram of a fault-powered switching power supply in accordance with the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings, and referring initially to FIGS. 1 and 2, the power supply 10 delivers power on an output line 11 to the trip unit or related circuitry (not shown) of the circuit breaker over a wide range of line power fluctuations, and does so efficiently by switching the power input as a function of the line power. FIG. 2 shows waveforms depicting several cycles of operation of the power supply 10 at various nodes in the circuit. A current transformer 12 delivers power to the power supply 10 by sensing current flowing through a power line 14. In industrial applications, for example, the current on the power line 14 alternates at 50 or 60 hertz with an average d.c. value of zero and a peak value of 100 amperes. A full-wave rectifier 16 converts the alternating current signal to a rectified current signal having an average d.c. value of about 70/n amperes and a peak value of 100/n amperes, where "n" is the turns ratio of the current transformer 12. As an example, a line current having a peak value of about 100 amperes results in a rectified current signal having a peak value of about 10 amperes using a current transformer having a standard turns ratio of 50:5. The rectified signal provides power to the trip unit and is available across the positive output of the rectifier 16 and its negative output, which is connected to circuit ground through a load resistor 24.

To efficiently use the power, a bypass switch 18 controls the delivery of the rectified signal to the remainder of the power supply. The switching action selectively samples the full-wave rectified signal to provide power to the power supply 10. When open, the bypass switch 18 directs the rectified signal to a charging circuit 20. The charging circuit 20 acts as a storage device to provide power to peripheral circuits so that only a minimal amount of power is drawn from the current transformer 12 during a selected amount of the operating cycle. The rectified signal charges the charging circuit 20 to a peak voltage during the sampling time. The voltage signal delivered by the charging circuit 20 is preferably conditioned by a voltage regulator 22. The voltage regulator 22 limits the output voltage from the charging circuit 20 so that the resulting regulated dc voltage waveform is substantially free from fluctuations. The regulated output voltage is suitable to power the rest of the circuitry, and typically retains a value of +5 volts or 15 volts.

When closed, the bypass switch 18 provides a low impedance path for the full-wave rectified signal. The full-wave rectified signal produced by the rectifier 16 bypasses the charging circuit 20 to flow through the bypass switch 18 and the load resistor 24 to circuit ground. During this period, the full-wave rectified signal is not available for recharging the charging circuit 20, and the charging circuit 20 discharges in response to the power being demanded at the output 11 of the power supply 10.

The load resistor 24 is selected to have a low resistance value, typically about 10 ohms. Thus, when the power demanded from the power supply 10 is being delivered from the charging circuit 20 as it discharges, the power supply 10 draws little power from the power lines due to the low resistance of the load resistor 24. Also, switching the full-wave rectified signal to the low impedance path conserves power since the low resistance provided by the resistance 24 dissipates considerably less power than the charging circuit 20. The output voltage from the charging circuit 20 falls as it continues to discharge as long as the bypass switch 18 remains closed. When the switch reopens, current is again drawn from the current transformer 12 for recharging the charging circuit 20 to keep the voltage delivered to the voltage regulator 22 at a level sufficient to operate the peripheral circuitry.

The operation of the bypass switch 18 is controlled by a comparator 26 which receives signals from the charging circuit 20 on its non-inverting input (node B) and from a feedback circuit 28 on its inverting input (node B). These signals determine when the comparator 26 switches the bypass switch 18 between conducting (closed) and non-conducting (open) states. The signal from the charging circuit 20 is correlative to the output voltage of the charging circuit 20, and the signal from the feedback circuit 28 is correlative to the current on the power line. The signal from the feedback circuit 28 is derived from a signal taken across the load resistor 24, which is essentially a mirror image of the full-wave rectified signal, and acts as a switching input for the comparator 26.

As can be seen from a study of FIG. 2A, the waveform on the inverting input (node B) appears as an inverted full-wave rectified signal having a positive d.c. offset. The waveform on the non-inverting input (node B) appears as a ramp signal which has a positive d.c. offset, and which repeatedly intersects the inverted full-wave rectified signal. When these waveforms intersect, i.e., when the signals represented by these waveforms are equal to each other, the comparator 26 switches its output. The output of the comparator 26 is connected to the bypass switch 18 and correspondingly switches the bypass switch 18 between conductive and nonconductive states.

FIG. 2B shows the operation of the bypass switch 18 relative to the intersections of the waveforms shown at FIG. 2A. During the first period T1, the bypass switch 18 is closed. When closed, the bypass switch 18 completes the low impedance path through the load resistor 24 and the full-wave rectifier 16 to circuit ground. The incoming full-wave rectified signal bypasses the charging circuit 20 in favor of the low impedance path presented by the resistor 24. Therefore, the charging circuit 20 discharges during the first period T1 to power the voltage regulator 22. This is clearly illustrated by the period T1 of the waveform in FIG. 2C, which is a representation of the output of the charging circuit 20 at node C.

Referring again to FIG. 2A, as the charging circuit 20 discharges, the magnitude of the signal on the non-inverting input of the comparator 26 falls below the magnitude of the signal on the inverting input, causing the output of the comparator 26 to switch states. Since the output of the comparator 26 controls the bypass switch 18, it also changes states and opens during the period T2. When open, the bypass switch 18 directs the full-wave rectified signal to the charging circuit 20 to recharge the charging circuit, as shown by the increasing voltage in period T2 of FIG. 2C. During the period T2, the charge on the charging circuit 20 increases, so the magnitude of the signal on the non-inverting input of the comparator 26 increases. When the magnitude of the signal on the non-inverting input becomes greater than the magnitude of the signal on the inverting input, the comparator 26 switches states and closes the bypass switch 18 to route the full-wave rectified signal through the low impedance path.

According to an important aspect of this invention, a substantially constant load is maintained on the current transformer 12, by ensuring that the bypass switch 18 changes states near the zero points of the full-wave rectified signal, which in turn correspond to the zero crossing points of the current signal on the power line. A change in load results in errors in the output current of the current transformer 12, which can cause unacceptable errors in the signal from the load resistor 24. The feedback circuit 28 serves as a means for ascertaining these zero crossing points so that the bypass switch 18 is switched about the zero crossing points. In FIG. 2A, the upper peaks of the waveform at node B represent zero crossing points. As shown therein, the comparator 26 opens the bypass switch 18 near the zero crossing points so that the charging circuit 20 recharges during the period T2.

Because the recharging of the charging circuit 20 draws a significant amount of power, it is important to have recharging performed in such a way as to have a minimal loading effect on the current signal. Since the loading effect on an input source is proportional to the magnitude of the input current through the input impedance, the switching is done near the zero crossing points of the current signal where the input current is so low that the input signal experiences only minor loading effects. Typically, the loading effects are acceptable when about ten to thirty percent of the full-wave rectified signals peak value is used for charging. However, a smaller percentage of the rectified signal may be sampled during the recharging cycle, if the sample is sufficient to provide adequate power to the peripheral circuits connected to the output of the power supply. During the remainder of the current cycle, the full-wave rectified signal passes through the low impedance path, which dissipates little power as compared to the recharging cycle.

Figure 3:
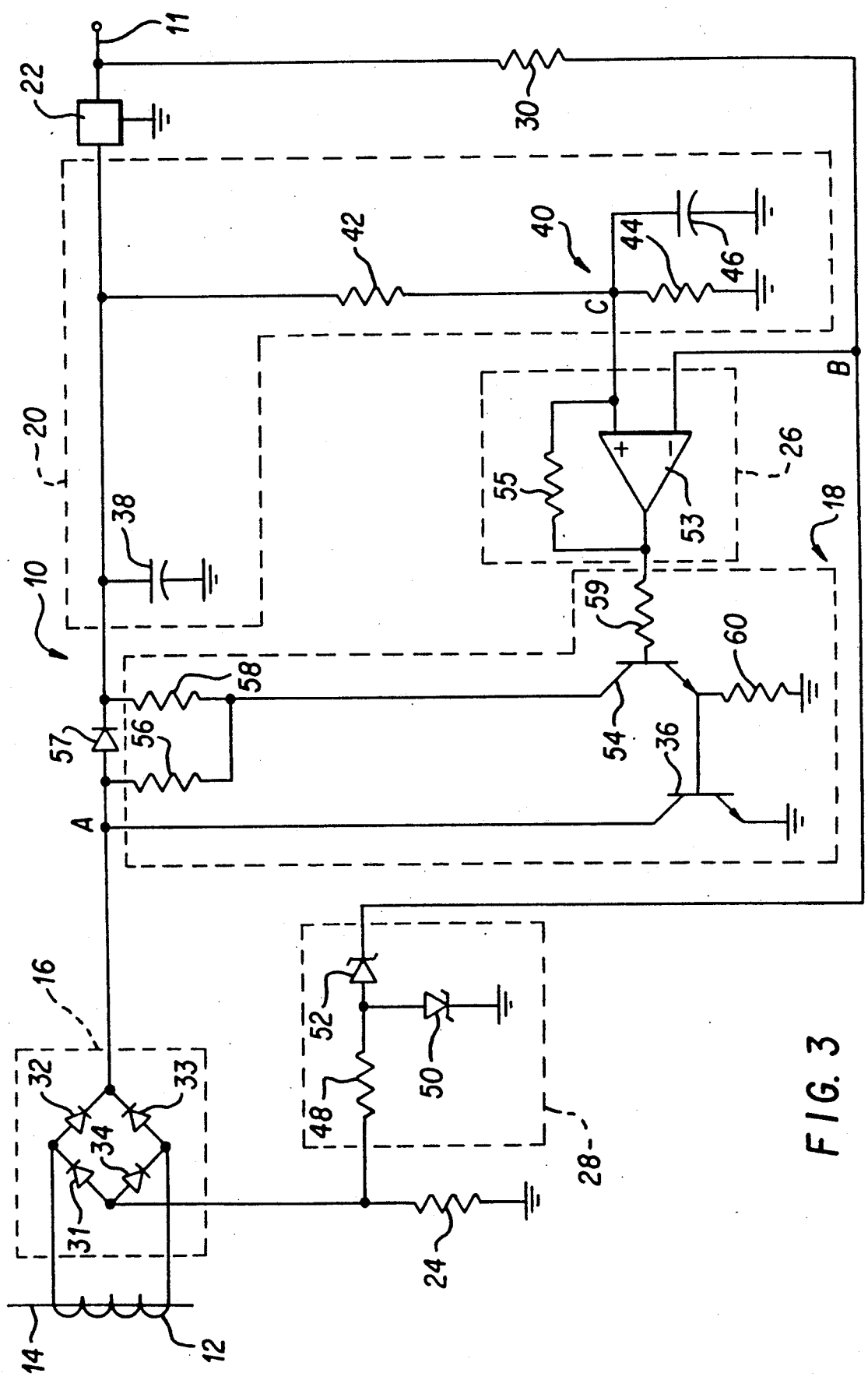
FIG. 3 is a schematic diagram of a preferred embodiment of a fault-powered switching power supply in accordance with the present invention.

FIG. 3 is a schematic diagram of a preferred embodiment of the power supply 10 of FIG. 1, wherein like reference numerals designate corresponding portions of the power supply circuit in FIG. 1. The current transformer 12 senses the current in the power line 14, and delivers the sensed current signal to a conventional full-wave rectifier 16 which comprises four diodes 31-34 connected in the form of a standard bridge rectifier. The full-wave rectifier 16 outputs, at node A, a full-wave rectified signal which follows the path of least resistance, either through the bypass switch 18 or through the charging circuit 20.

The bypass switch 18 comprises a transistor 36 which has a grounded emitter. The collector of transistor 36 is connected to the output of rectifier 16 at node A and its base is connected to ground through a resistor 60 and to the emitter of a transistor 54. The collector of transistor 54 is connected to the junction of a pair of resistors 56 and 58 respectively leading to the anode and cathode ends of a diode 57 which connects node A to the charging circuit 20. The base of transistor 54 is linked through a resistor 59 to the output of the comparator 26 which comprises an operational amplifier 53 having a resistor 55 in its positive feedback path.

The charging circuit 20 comprises a charging element in the form of a capacitor 38 connected between the diode 57 at node A and circuit ground. At the diode end the capacitor 38 is connected to the junction of the voltage regulator 22 leading to the output 11, and a resistor 42 which leads to node C. Node C is defined by the junction of a resistor 44 and a capacitor 46 connected in parallel across circuit ground, and is also connected to the non-inverting input of the amplifier 53 of the comparator 26.

The feedback circuit 28 comprises a resistor 48 connected to the load resistor 24 and leading, through a zener diode 52, to node B, which is connected to the inverting input of the comparator 53 and to the output 11 of the converter through a resistor 30. The junction of the resistor 48 and the anode of the zener diode 52 is connected to the anode of a second zener diode 50, the cathode of which is connected to circuit ground.

In order to control the path of the full-wave rectified signal, the voltage across the capacitor 38 is compared with the feedback signal from the load resistor 24. The capacitor 38 charges to a voltage higher than the output voltage of the voltage regulator 22, and thus has a positive d.c. offset, as shown in FIG. 2C. The feedback signal, produced from the signal across the load resistor 24, is essentially a mirror image of the full-wave rectified signal. Since the voltage drop across the load resistor 24 is negative with respect to circuit ground, the signal has a negative d.c. offset. Therefore, the feedback signal is superimposed (at node B) on the output of the voltage regulator 22 to give it a positive d.c. offset for comparison with the output signal from the capacitor 38.

In the comparator 26, the two resistors 42 and 44 form a voltage divider 40 at the non-inverting input of the amplifier 53. The voltage divider reduces the d.c. offset of the output of the capacitor 38 so that the magnitude of the signal is similar to the magnitude of the signal at node B. The second capacitor connected in parallel to the resistor 44 acts as a low pass filter to prevent higher order harmonics from contaminating the signal at the non-inverting input of the comparator 26. The inverting input of the comparator 26 receives a voltage limited feedback signal from the feedback circuit 28. The inverted full-wave rectified signal across the load resistor 24 is limited by the resistor 48 and the zener diode 50, so that the feedback signal has a maximum positive voltage of about 0.7 volts and a maximum negative voltage of about −2.0 to −4.0 volts before it is combined with the output of the voltage regulator 22 at node B. Alternatively, the zener diode 50 may be replaced by a signal diode so as to limit the negative voltage to approximately 0.7 volts. The second zener diode 52 isolates the feedback circuit 28 from the output voltage of the voltage regulator 22.

When the voltage on the non-inverting input of the comparator 26 exceeds the voltage on the inverting input, the comparator 26 outputs a "high" or positive voltage signal to render a transistor 54 conductive. When the transistor 54 is conductive, current flows to circuit ground through the two parallel resistors 56, 58, the transistor 54, and the resistor 60. Current flowing through the resistor 60 causes a "high" voltage signal to appear at the base of the transistor 36, which renders the transistor 36 conductive to provide a low-impedance path for the full-wave rectified signal. The diode 57 isolates the capacitor 38 from the shorted switch to prevent the capacitor 38 from discharging through the low impedance path. As explained previously in reference to FIG. 2, the low-impedance path through the load resistor 24 does not significantly load the current transformer 12, nor is the capacitor 38 charged during this time. While the full-wave rectified signal is diverted to the low impedance path, the capacitor 38 discharges to provide the voltage regulator 22 with sufficient power for the associated circuitry.

As the capacitor 38 discharges, the voltage at the non-inverting input of the comparator 26 falls below the level of the voltage on the inverting input. This causes the comparator 26 to output a "low" voltage signal (0.5 volts) to render the transistor 54 nonconductive. Since the transistor 54 no longer conducts current, no current flows through the resistor 60, and no voltage appears at the base of the transistor 36. Therefore, the transistor 36 becomes nonconductive and effectively presents an open circuit to the full-wave rectified signal at node A. Since the full-wave rectified signal has only one available path, the capacitor 38 receives the full-wave rectified signal. The capacitor 38 charges until the voltage at the non-inverting input of the comparator 26 exceeds the voltage on the inverting input. When this occurs, the comparator 26 again closes the bypass switch 18 by delivering a "high" voltage signal which renders the transistors 36 and 54 conductive again.

The capacitor 38 charges near the zero crossing points of the current signal on the power line due to the nature of the signals being compared by the comparator 26. As the output signal from the discharging capacitor 38 falls, the feedback signal rises. When the magnitudes of the signals are equal, the comparator 26 switches states to allow the capacitor 38 to recharge by receiving the full-wave rectified signal. As the capacitor 38 recharges, the output of the capacitor 38 also rises. During the recharging period T2, the feedback signal reaches a peak, which corresponds to a zero crossing point of the monitored current signal, and then begins to fall. When the magnitudes are again equal, the comparator 26 switches states so that the full-wave rectified signal bypasses the capacitor 38, thus allowing the capacitor 38 to discharge to provide output power for the power supply 10.

In certain applications it is required that the power supply feeding a circuit breaker arrangement be capable of quickly satisfying power requirements. In accordance with this invention, this requirement is satisfied by the provision of an alternate power source within the power supply. Such an arrangement is illustrated in FIG. 4 for a power supply, which, according to an alternate embodiment of this invention, is adapted for operation with a three-phase power source.

Figure 4:
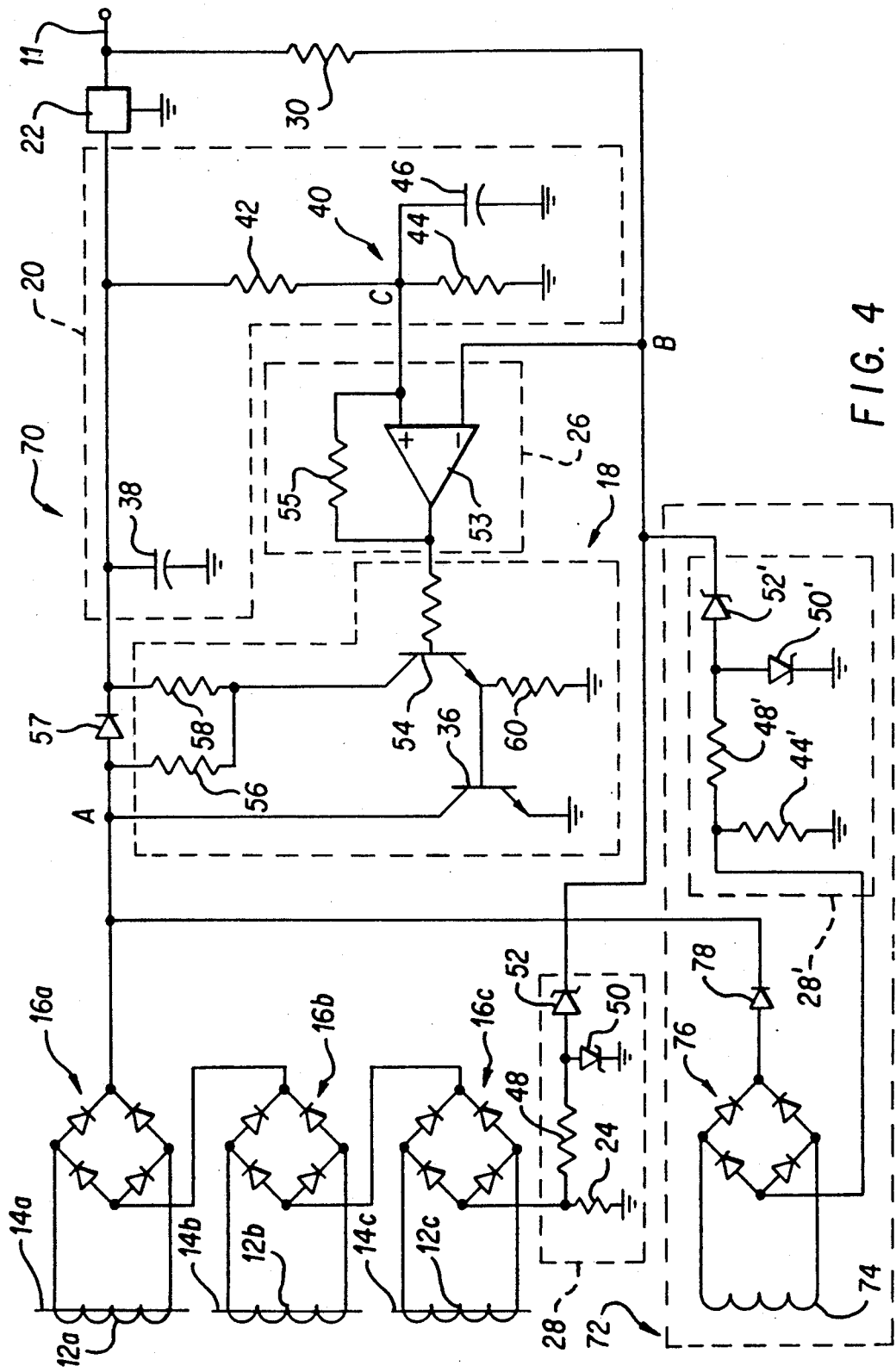
FIG. 4 is a schematic diagram of a fault-powered switching power supply having an alternate source of power in accordance with an alternate embodiment of the present invention.

The power supply 70 of FIG. 4 is identical to the power supply 10 shown in FIG. 3 except for the provision of an alternate power source 72 and separate current transformers 12a, 12b, and 12c for sensing the current in each of the three lines of the three-phase power source. The operation of the bypass switch 18, the charging circuit 20, the comparator 26, the voltage regulator 22, and the feedback circuit 28 is identical to the operation described with reference to FIG. 3 and, accordingly, will not be described here. In the power supply of FIG. 4, the sensed current from each of the three current transformers 12a, 12b, and 12c is rectified by corresponding serially connected full-wave rectifiers 16a, 16b, and 16c. Because the rectifiers are serially connected, the current signal at node A is equal to the largest of the three full-wave rectified current signals.

The alternate power source 72, according to an illustrative form, includes a summing current transformer 74 adapted to sense any current imbalance between the signals being sensed by the line transformers 12a, 12b, and 12c and generates an output corresponding to the vectorial sum of these three current signals. The current sensed by the transformer 74 is rectified by a bridge rectifier 76 which is identical to the bridge rectifiers 16a–c used with the transformers 12a–c. The output of rectifier 76 is linked to node A through an isolating diode 78. The alternate power source 72 also includes a feedback circuit 28' which is identical to the feedback circuit 28 used with the line transformers and delivers a positive feedback signal to node B. More specifically, the feedback circuit 28' includes an input point defined by the junction of a resistor 24, which leads to ground, and a resistor 48', which is connected to a first zener diode 52' leading to node B and also to a second zener diode 50' leading to ground.

Because of the three-phase nature of the power source, the current signals in each of the three lines are 120° out of phase with one another and the vectorial sum of the signals equals a constant value of zero during normal operation. Hence, the summing current transformer 74 does not contribute to the signal at node A during normal operation.

However, if the current in one of the three-phase lines experiences an abnormal condition, such as a ground fault, the vectorial sum of the currents in the three conductors is not zero. The summing current transformer 74 senses an imbalance between the current transformers 12a, 12b, and 12c and outputs a voltage signal to a full-wave rectifier 76 which corresponds to the magnitude of the imbalance. Since it is possible for slight imbalances to exist in the three-phase lines during normal operation, the summing current transformer 74 is preferably adjusted to generate an imbalance signal only if at least a predetermined amount of imbalance is detected. The full-wave rectified signal is received at node A, and adds to the current signal output from the serially connected three-phase current transformers 12a, 12b, and 12c. This larger power signal charges the capacitor 38 to a higher voltage level to quickly provide extra power to the voltage regulator 22. The voltage regulator 22 thus becomes capable of providing the extra power necessitated by the presence of abnormal conditions, such as ground faults, which can cause the trip unit or electromagnetic tripping relay of the circuit breaker to be energized and interrupt current flow. While the ground fault tripping circuitry is not shown as part of the power supply 70, it should be understood that such tripping circuitry can also monitor the output of the current transformer 74 and signal the electromagnetic relay to trip if a predetermined amount of imbalance is detected.

The power source 72, accordingly, functions as a parallel source of power. The arrangement allows the circuitry, under normal conditions, to be powered up by either the summing transformer 74 of the alternate power source 72 or any of the phase transformers 12a, 12b or 12c. When a ground fault condition occurs, power to the circuit breaker can be supplied by the combination of the summing transformer and one of the phase transformers.

What is claimed is:

1. A power supply for a circuit breaker, comprising:
   means for providing a current signal having a magnitude correlative to the current flowing in a conductor;
   a charging circuit which is charged by said current signal and which delivers to said circuit breaker a voltage signal having a magnitude correlative to the charge stored in said charging circuit;
   means for generating a current signal correlative to said delivered voltage signal;
   means for directing said current signal through said charging circuit when the magnitude of said voltage correlative signal is below a predetermined magnitude of said current signal; and
   means for bypassing said charging circuit when the magnitude of said voltage correlative signal is above said predetermined magnitude of said current signal.

2. The power supply, as set forth in claim 1, wherein said providing means includes a current transformer positioned proximate said conductor to inductively sense current flowing through said conductor.

3. The power supply, as set forth in claim 1, wherein the predetermined magnitude of said voltage correlative signal is equal to the magnitude of said current signal.

4. The power supply, as set forth in claim 1, wherein the predetermined magnitude of said voltage correlative signal is about 70 to 80 percent of the peak value of said current signal.

5. A power supply for a circuit breaker, comprising:
   means for providing a current signal having a magnitude correlative to the current flowing in a conductor;
   a charging circuit which is charged by said current signal and which delivers a voltage signal having a magnitude correlative to the charge stored in said charging circuit;
   means for generating a current signal correlative to said delivered voltage signal;
   a low impedance circuit which bypasses said charging circuit; and
   means for directing said current signal through said charging circuit when the magnitude of said voltage correlative signal falls below a predetermined magnitude of said current signal, and redirecting said current signal through said low impedance circuit when the magnitude of said voltage correlative signal rises above said predetermined magnitude of said current signal.

6. The power supply, as set forth in claim 5, wherein said providing means includes a current transformer positioned proximate said conductor to inductively sense current flowing through said conductor.

7. The power supply, as set forth in claim 5, wherein said low impedance circuit includes a load resistor.

8. The power supply, as set forth in claim 5, wherein the predetermined magnitude of said current signal is equal to the magnitude of said current signal.

9. The power supply, as set forth in claim 5, wherein the predetermined magnitude of said current signal is about 70 to 80 percent of the peak value of said current signal.

10. A power supply for a circuit breaker, comprising:
    means for providing a current signal correlative to the current flowing in a conductor;
    a charging circuit which is charged by said current signal and which delivers a voltage signal having a magnitude correlative to the charge stored in said charging circuit;
    a low impedance path which bypasses said charging circuit;
    means for producing a feedback signal having a magnitude correlative to the current in said conductor;
    means for comparing said feedback signal with said voltage signal; and means for directing said current signal through said low impedance path in response to the magnitude of said voltage signal being greater than the magnitude of said feedback signal, and directing said current signal through said charging circuit in response to the magnitude of said voltage signal being less than the magnitude of said feedback signal.

11. The power supply, as set forth in claim 10, wherein said low impedance path includes a load resistor.

12. The power supply, as set forth in claim 10, wherein said feedback signal is greater than said voltage signal near zero crossing points of said current signal.

13. The power supply, as set forth in claim 10, further comprising:
a full-wave rectifier which receives said current signal and produces a full-wave rectified current signal.

14. The power supply, as set forth in claim 13, wherein said full-wave rectified current signal charges said charging circuit for a first period of time which includes the zero crossing point of said current signal, and passes through said low impedance path for a second period of time which is longer than said first period of time and which includes the maximum point of said full-wave rectified current signal.

15. A power supply for a circuit breaker, where the circuit breaker carries and interrupts current in a conductor, comprising:
a current transformer which provides a current signal correlative to the current flowing in said conductor;
a full-wave rectifier which rectifies said current signal;
a storage element which is charged by said rectified current signal and is discharged to power peripheral circuits connected to the output of said power supply, and which delivers a voltage signal correlative to the charge on said storage element;
a low impedance path which bypasses said storage element;
a bypass switch which directs said rectified current signal to said storage element, and which redirects said rectified current signal to said low impedance path;
a voltage regulator which receives said voltage signal and limits said voltage signal to produce a dc voltage signal;
a load resistor having a voltage correlative to said current signal, and which delivers a feedback signal having a magnitude correlative to the current in said conductor; and
a comparator which compares the magnitude of said feedback signal with the magnitude of said voltage signal, and delivers a switching signal to said bypass switch responsive to the magnitude of said voltage signal being greater than the magnitude of said feedback signal to redirect said rectified current signal to said low impedance path.

16. A power supply for a circuit breaker, where the circuit breaker carries current in three conductors of a three-phase distribution circuit and can selectively interrupt current flowing in any of said conductors in response to a detected fault, comprising:
means for providing a current signal correlative to the maximum current flowing in said three conductors;
means for providing a current signal correlative to the sum of the currents flowing through each of said three conductors;
means for adding said summed current signal to said maximum current signal;
a charging circuit which is charged by said added current signal and which delivers a voltage signal having a magnitude correlative to the charge stored in said charging circuit;
means for generating a current signal correlative to said delivered voltage signal;
a low impedance circuit which bypasses said charging circuit; and
means for directing said added current signal through said charging circuit when the magnitude of said voltage correlative signal falls below a predetermined magnitude, and redirecting said added current signal through said low impedance circuit when the magnitude of said voltage correlative signal rises above said predetermined magnitude.

17. The power supply, as set forth in claim 16, wherein said providing means includes a current transformer positioned proximate each respective conductor to inductively sense current flowing through said respective conductor.

18. The power supply, as set forth in claim 16, wherein said low impedance circuit includes a load resistor.

19. The power supply, as set forth in claim 16, wherein the predetermined magnitude of said voltage correlative signal is equal to the magnitude of said maximum current signal.

20. The power supply, as set forth in claim 16, wherein the predetermined magnitude of said voltage correlative signal is about 70 to 80 percent of the peak value of said maximum current signal.

21. A power supply for a circuit breaker, where the circuit breaker carries current in three conductors of a three-phase distribution circuit and can selectively interrupt current flowing in any of said conductors in response to a detected fault, comprising:
a first current transformer positioned to monitor current flowing through a first of said three conductors, and delivering a current signal correlative to the current flowing in said first conductor;
a second current transformer positioned to monitor current flowing through a second of said three conductors, and delivering a current signal correlative to the current flowing in said second conductor;
a third current transformer positioned to monitor current flowing through a third of said three conductors, and delivering a current signal correlative to the current flowing in said third conductor;
a summing current transformer which sums the currents flowing through each of said three conductors, and delivers a current signal having a magnitude correlative to the sum of the currents flowing through each of said three conductors;
a first rectifier which rectifies said first current signal;
a second rectifier which rectifies said second current signal;
a third rectifier which rectifies said third current signal, said three rectifiers being serially connected to deliver a signal having a magnitude correlative to the maximum of said three rectified current signals;

means for rectifying said summed current signal, and adding said rectified summed current signal to said maximum rectified current signal;

means for directing said added rectified current signal to a storage element which is charged by said added rectified current signal and which delivers a voltage signal correlative to the charge on said storage element;

means for regulating said voltage signal to deliver a dc voltage signal;

first means for producing a first feedback signal correlative to the maximum current in said three conductors;

second means for producing a second feedback signal correlative to the sum of the currents in said three conductors, and adding said first feedback signal to said second feedback signal to produce a total feedback signal; and means for comparing said total feedback signal with said voltage signal, and delivering a switching signal in response to the magnitude of said total feedback signal equaling the magnitude of said voltage signal to said directing means to redirect said rectified current signal to a low impedance path.

22. The power supply, as set forth in claim 21, wherein said added rectified current signal is directed to said low impedance path in response to said voltage signal being greater than said total feedback signal.

23. The power supply, as set forth in claim 21, wherein said added rectified current signal is directed to said storage element in response to said voltage signal being less than said total feedback signal.

24. The power supply, as set forth in claim 21, wherein said added rectified current signal charges said storage element for a first period of time which includes the zero point of said added rectified current signal, and passes through said low impedance path for a second period of time which is longer than said first period of time and which includes the maximum point of said added rectified current signal.

25. A method for supplying power to a circuit breaker, where the circuit breaker carries current in a conductor, comprising the steps of:

producing a signal having a magnitude correlative to the current flowing in said conductor;

directing said current signal to a storage element;

charging said storage element with said current signal;

delivering a voltage signal correlative to the charge on said storage element;

producing a feedback signal having a magnitude correlative to the current in said conductor;

producing a current signal correlative to said delivered voltage signal;

comparing said feedback signal with said voltage correlative signal; and redirecting said current signal away from said storage element onto a low impedance path when the magnitude of said voltage correlative signal is greater than the magnitude of said feedback signal.

26. The method, as set forth in claim 25, wherein the magnitude of said feedback signal corresponds to about 70-80 percent of the peak value of said current signal.

27. A method for supplying power to a circuit breaker, where the circuit breaker carries current in three conductors of a three-phase distribution circuit and can selectively interrupt current flowing in any of said conductors in response to a detected fault, comprising the steps of:

providing current signals correlative to the current flowing in said respective conductors;

providing a summed current signal correlative to the sum of the currents flowing in each of said conductors;

rectifying said current signals and said summed current signal;

adding said summed rectified current signal to the maximum of said certified current signals;

directing said added rectified signal to a storage element for charging said storage element therewith;

delivering from said storage element a voltage signal correlative to the charge on said storage element;

generating a current signal correlative to said delivered voltage signal; and redirecting said added rectified current signal away from said storage element to a low impedance path when said voltage correlative signal exceeds a predetermined magnitude of said added rectified current signal.

* * * * *